(12) United States Patent
Redding

(10) Patent No.: US 7,018,557 B2
(45) Date of Patent: Mar. 28, 2006

(54) MAGNETIC AEROSOL PAINT COMPOSITION

(75) Inventor: Patricia L. Redding, South Euclid, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 10/764,313

(22) Filed: Jan. 23, 2004

(65) Prior Publication Data

US 2004/0211936 A1 Oct. 28, 2004

Related U.S. Application Data

(60) Provisional application No. 60/442,732, filed on Jan. 24, 2003.

(51) Int. Cl.
H01F 1/37 (2006.01)
H01F 41/41 (2006.01)
B65D 83/14 (2006.01)
B65D 83/32 (2006.01)
B65D 83/36 (2006.01)

(52) U.S. Cl. .............. 252/62.54; 239/337; 427/128; 427/427; 427/427.4

(58) Field of Classification Search ............ 252/62.54; 239/337; 427/128, 427, 427.4
See application file for complete search history.

(56) References Cited

U.S. PATENT DOCUMENTS

| | | | |
|---|---|---|---|
| 2,895,851 A * | 7/1959 | Johnson | 427/598 |
| 3,503,882 A | 3/1970 | Fitch | 252/62.54 |
| 4,146,064 A | 3/1979 | Hughes et al. | 141/3 |
| 4,923,097 A * | 5/1990 | Bartlett | 222/394 |
| 5,587,102 A | 12/1996 | Stern et al. | 252/62.54 |
| 5,609,788 A | 3/1997 | Deetz | 252/62.54 |
| 5,843,329 A | 12/1998 | Deetz | 252/62.54 |

FOREIGN PATENT DOCUMENTS

| | | | |
|---|---|---|---|
| GB | 2119518 | * | 11/1983 |
| GB | 2119518 A | | 11/1983 |
| GB | 2234555 A | | 2/1991 |
| GB | 2259919 A | | 3/1993 |

OTHER PUBLICATIONS

International Search Report for PCT/US2004/001813, 3 pages.
PCT Written Opinion dated Jun. 29, 2004, International Application No. PCT/US04/01813, International Filing Date Jan. 23, 2004, corresponding to U.S. Appl. No. 10/764,313.
Notification Of Transmittal Of International Preliminary Report On Patentability dated Jan. 14, 2005, International Application No. PCT/US04/01813, International Filing Date Jan. 23, 2004, corresponding to U.S. Appl. No. 10/764,313.
International Search Reposrt for PCT/US2004/001813, 3 pages.

* cited by examiner

Primary Examiner—C. Melissa Koslow
(74) Attorney, Agent, or Firm—Robert E. McDonald; Vivien Y. Tsang; Paul R. Katterle

(57) ABSTRACT

A pressurized paint product that includes an magnetic aerosol paint composition disposed in a container. The magnetic aerosol paint composition includes volatile organic solvents, an alkyd resin, and ferromagnetic particles.

27 Claims, 1 Drawing Sheet

MAGNETIC AEROSOL PAINT COMPOSITION

CROSS-REFERENCE TO RELATED APPLICATION

This application claims the benefit of U.S. provisional patent application No. 60/442,732 filed on Jan. 24, 2003, the entirety of which is hereby incorporated by reference.

BACKGROUND OF THE INVENTION

This invention relates to paint compositions in general and, more particularly, to paint compositions that can be dispensed in an aerosol spray from a sealed and pressurized container.

Magnetic paint compositions that are formulated for application by brush or other mechanical means are known in the art. Examples of such prior art magnetic paint compositions are disclosed in U.S. Pat. Nos. 3,503,882; 5,587,102; 5,609,788; and 5,843,329 which are hereby incorporated by reference. Heretofore, a magnetic aerosol paint composition has not been provided.

BRIEF DESCRIPTION OF THE DRAWING

The features, aspects, and advantages of the present invention will become better understood with regard to the following description, appended claims, and accompanying drawing where:

DETAILED DESCRIPTION OF THE PREFERRED EMBODIMENTS

Figure 1:
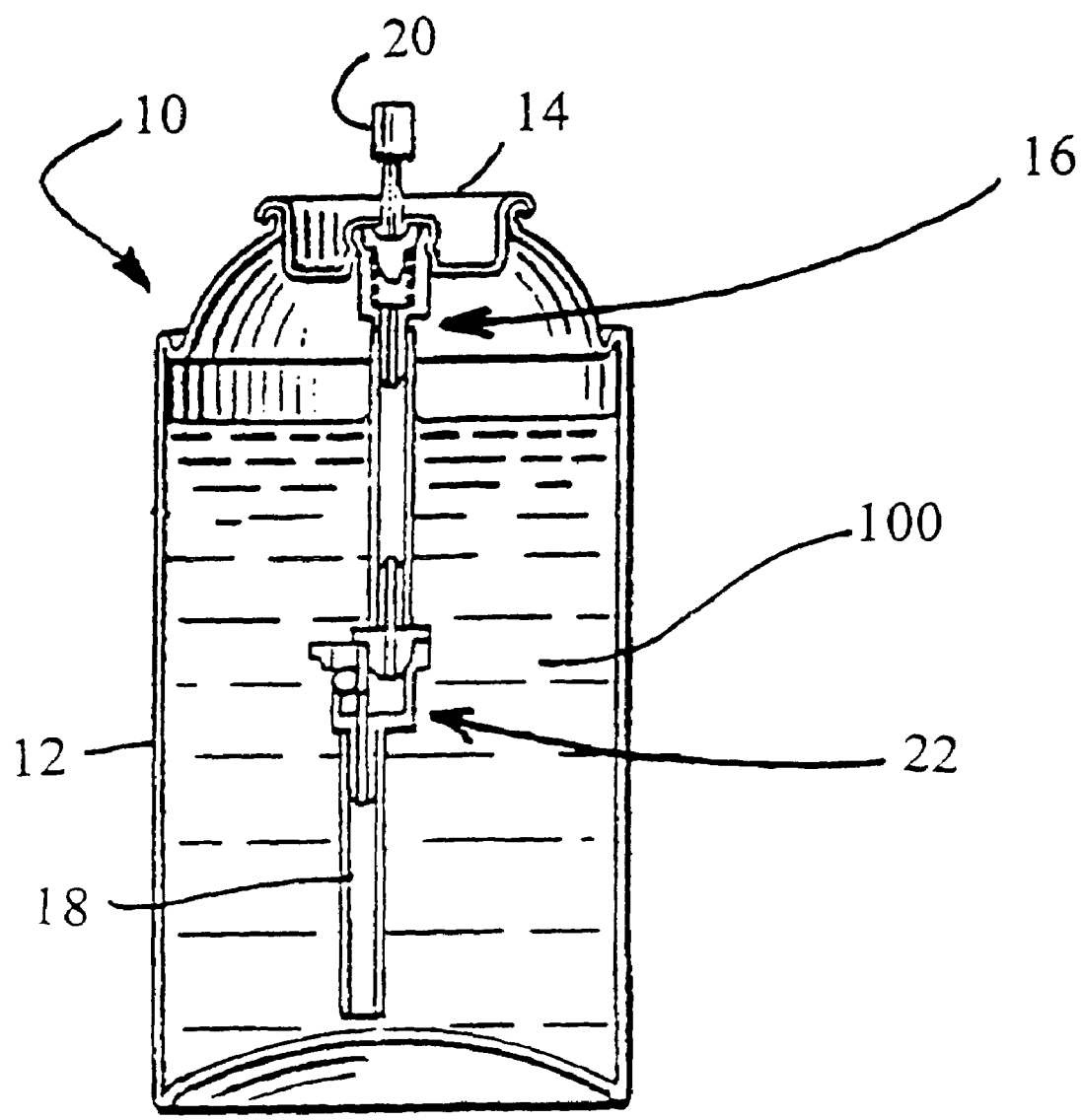
FIG. 1 shows a schematic view of an aerosol container charged with a magnetic aerosol paint composition embodied in accordance with the present invention.

As used herein, the term "volatile organic solvent" shall mean an organic solvent capable of vaporizing at atmospheric pressure and a temperature in a range from about 35° F. to about 140° F.

The magnetic aerosol paint composition of the present invention generally comprises a solvent-borne paint composition and a propellant. The magnetic aerosol paint composition is substantially free of water, i.e., has a moisture content less than about 0.2 weight percent.

The solvent-borne paint composition generally comprises a solvent system, a resin system and ferromagnetic particles. The solvent-borne paint composition also preferably includes whitening pigment and a desiccant.

The solvent system comprises at least one volatile organic solvent. Volatile organic solvents that may be used in the solvent system include alcohols, such as methanol, ethanol, isopropanol, 2-butoxy ethanol, and n-butyl alcohol; ketones, such as acetone, methyl ethyl ketone, methyl propyl ketone, and methyl isobutyl ketone; aliphatic hydrocarbons, such as hexane and heptane; aromatic hydrocarbons, such as toluene and xylene; aromatic and aliphatic naphthas; petroleum and wood distillates; turpentine; pine oil, and the like. Mixtures of the foregoing solvents may also be used and are in fact frequently preferred. For at least one useful coating composition, the preferred solvent system comprises toluene, aromatic naptha and 2-butoxy ethanol.

The amount of the solvent system present in the solvent-borne paint composition is at least 8 weight percent of the total weight of the solvent-borne paint composition. Preferably, the amount of the solvent system present in the solvent-borne paint composition is from about 10 to about 30 weight percent, more preferably from about 10 to about 20 weight percent of the total weight of the solvent-borne paint composition.

The resin system comprises one or more film-forming resins, that is, any natural or synthetic resin capable of forming a continuous film upon evaporation of any carrier or solvent. The resin should be capable of drying or curing after application to a substrate. A wide variety of resins, including acrylic resins, aliphatic hydrocarbon resins, polyurethane resins and others, can be selected depending upon the desired final performance properties. For many applications it is useful to utilize a resin selected from the group consisting of (i) alkyd resins, including modified alkyds such as vinyl toluene modified alkyd resins, acrylic modified alkyd resins, styrene modified alkyd resins, acrylic/vinyl toluene modified alkyd resins, and styrene/vinyl toluene modified alkyd resins; (ii) aromatic hydrocarbon resins; and (iii) epoxy ester resins. For many applications, a preferred resin system would comprise an alkyd, such as a vinyl toluene modified alkyd resin or epoxy ester resins.

A commercially available vinyl toluene modified alkyd resin that may be used in the magnetic aerosol paint composition is POLYCHEM OP 94-1 sold by OPC Polymers of Columbus, Ohio. POLYCHEM OP 94-1 is a modified alkyd formed from soybean oil and linseed oil.

The amount of the resin system present in the solvent-borne paint composition is at least 18 weight percent of the total weight of the solvent-borne paint composition. Preferably, the amount of the resin system present in the solvent-borne paint composition is from about 20 to about 50 weight percent, more preferably from about 20 to about 35 weight percent of the total weight of the solvent-borne paint composition.

The ferromagnetic particles used in the solvent-borne paint composition may be powdered iron, magnetic iron oxide, magnetic powdered steel, and magnetic iron alloys with nickel, zinc, copper, and the like, and mixtures thereof. Oxidized iron is generally not preferred for many embodiments as it tends to discolor the paint. Preferably, the ferromagnetic particles comprise powdered iron. The average particle size of the ferromagnetic particles is less than 10 microns. Preferably, the average size of the ferromagnetic particles is in a range from about 2 microns to about 7 microns, more preferably in a range from about 4 microns to about 6 microns. Still more preferably, the average size of the ferromagnetic particles is about 5 microns.

The amount of ferromagnetic particles present in the solvent-borne paint composition need only be the minimum required to impart the desired magnetic characteristics. For many useful applications the particles will be present at a level of at least 25 weight percent of the total weight of the solvent-borne paint composition. Preferably, the amount of the ferromagnetic particles present in the solvent-borne paint composition is from 25 to about 50 weight percent, more preferably from 30 to about 40 weight percent of the total weight of the solvent-borne paint composition. Still more preferably, the amount of the ferromagnetic particles present in the solvent-borne paint composition is about 37 weight percent of the total weight of the solvent-borne paint composition.

The whitening pigment may be selected from the group consisting of zinc oxide, titanium dioxide, zinc sulfate, antimony oxide, and mixtures of the foregoing. Preferably, the whitening pigment comprises titanium dioxide. The whitening pigment is added to the solvent-borne paint composition in amounts sufficient to lighten the magnetic aerosol paint composition so as to have a gray color.

Due to the presence of the ferromagnetic particles present in the solvent-borne paint composition, it is important that moisture be excluded so as to prevent the formation of rust. The moisture content of the magnetic aerosol paint composition is maintained at a level not higher than about 0.2% by weight. Such a low moisture level is provided by the inclusion of the desiccant in the solvent-borne paint composition, preferably a molecular sieve type desiccant. A desiccant which has been found to be especially useful in the formulation of the invention is the molecular sieve sold under the trade designation "Syloid ZN-1" by Davison Chemical Division of W. R. Grace. "Syloid ZN-1" corresponds to the chemical formula $Na_2O$:$Al_2O_3$: 2.8 $SiO_2$: $XH_2O$, has a moisture adsorptivity of up to 36% by weight, a density of 30 lbs/ft.sup.3, a particle size of 99.95% minus 325 mesh, a specific gravity of 2.103, and an oil absorption of 37 lbs/100 lbs. It has been found that the solvent-borne paint composition should normally contain between about 0.08 and about 2% by weight of the molecular sieve desiccant.

The solvent-borne paint composition of the present invention may include other ingredients, such as surfactants and dispersants, rheology modifiers, extenders, anti-skinning agents, drying agents, organic or inorganic colored pigments, light stabilizers and ultraviolet light absorbers.

Suitable dispersants and surfactants can comprise any of the dispersants and surfactants readily available to the coatings industry, including the anionic and nonionic surfactants, soya lecithin, alkyl ammonium salts of fatty acids, amine salts of alkyl aryl sulfonates, unsaturated organic acids, sulfonated castor oil, mixtures of high boiling point aromatic and ester solvents, sodium salts of aryl sulfonic acid, and the like.

Suitable rheology modifiers can comprise organoclays, fumed silica, dehydrated castor oil organic derivatives, English China Clay; polyamides, polyamide modified alkyds, alkylbenzene sulphonate derivatives, calcium and zinc stearates, calcium soyate, and the like.

Suitable extenders can comprise amorphous, diatomaceous, fumed, quartz and crystalline silica, clays, aluminum silicates, magnesium aluminum silicates, talc, mica, delaminated clays, calcium carbonates and silicates, gypsum, barium sulfate, zinc, calcium zinc molybdates, zinc oxide, phosphosilicates and borosilicates of calcium, barium and strontium, barium metaborate monohydrate, and the like. Preferably, talc is used as an extender in an amount comprising from about 5 weight percent to about 15 weight percent of the solvent-borne paint composition.

Anti-skinning agents that may used include methyl ethyl ketoxime, o-cresol, and hydroquinone.

Drying agents for increasing the cure of air curing resins, such as the alkyds, can comprise standard metallic and rare earth driers such as cobalt, calcium, potassium, barium, zinc, manganese, tin, aluminum, zirconium and vanadium napthenates, octoates, hexanates, and isodecanoates.

The magnetic aerosol paint composition of the present invention is formed by combining the solvent-borne paint composition (described above) with additional solvents and normally an antistatic agent, and then aerosolizing the combination with the propellant.

The antistatic agent may be selected from the group consisting of quaternary ammonium compounds and acrylic sulfonates. Preferably, the antistatic agent is a quaternary ammonium compound. A commercially available antistatic agent that may be used in the magnetic aerosol paint composition is Catafor CA 80, which is available from Rhodia. Catafor CA 80 is a quaternary ammonium ethosulfate. The amount of the antistatic agent present in the magnetic aerosol paint composition is preferably from about 0.1 to about 0.5 weight percent, more preferably about 0.2 weight percent of the total weight of the magnetic aerosol paint composition.

The propellant is a liquafiable gas having a vapor pressure sufficient to propel the magnetic aerosol paint composition from the container. Preferably, the propellant is selected from the group consisting of ethers, such as dimethyl ether (DME) and diethyl ether; C1–C4 saturated hydrocarbons, such as methane, ethane, propane, n-butane, and isobutane; hydrofluorocarbons (HFC), such as 1,1,1,2-tetrafluoroethane (HFC-134a), 1,1,1,2,3,3,3,-heptafluoropropane (HFC-227HFC), difluoromethane (HFC-32), 1,1,1-trifluoroethane (HFC-143a), 1,1,2,2-tetrafluoroethane (HFC-134), and 1,1-difluoroethane (HFC-152a); and mixtures of the foregoing. More preferably, the propellant is a blend of n-butane and propane.

The amount of the propellant present in the magnetic aerosol paint composition is preferably from about 10 to about 40 weight percent, more preferably from about 20 to about 35 weight percent, still more preferably about 30 weight percent of the total weight of the magnetic aerosol paint composition. When the propellant is present in an amount of from about 20 to about 35 weight percent, an initial pressure of between about 40 pounds per square inch and 70 pounds per square inch is obtained in the container.

The amount of volatile organic solvent present in the magnetic aerosol paint composition is at least 20 weight percent of the total weight of the magnetic aerosol paint composition. Preferably, the amount of volatile organic solvent present in the magnetic aerosol paint composition is from about 25 to about 50 weight percent, more preferably from about 25 to about 35 weight percent of the total weight of the magnetic aerosol paint composition.

The amount of polymer resin present in the magnetic aerosol paint composition is at least 4 weight percent of the total weight of the magnetic aerosol paint composition. Preferably, the amount of polymer resin present in the magnetic aerosol paint composition is from about 5 to about 30 weight percent, more preferably from about 7 to about 15 weight percent of the total weight of the magnetic aerosol paint composition.

The amount of ferromagnetic particles present in the magnetic aerosol paint composition is at least 8 weight percent of the total weight of the magnetic aerosol paint composition. Preferably, the amount of ferromagnetic particles present in the magnetic aerosol paint composition is from about 10 to about 30 weight percent, more preferably from about 15 to about 20 weight percent of the total weight of the magnetic aerosol paint composition.

Preferably, the solvent-borne paint composition of the present invention is made in a batch process at or below a temperature of 120° F. The solvent system is charged to a mixing vessel and blended for a short period of time to achieve a state of equilibrium. The resin system is charged to the mixing vessel and mixed with high shear dispensers to achieve complete dissolution in the solvent system. The pigment and other ingredients (excluding the ferromagnetic particles) are then added in stepwise fashion and thoroughly mixed therein. The desiccant is then added and thoroughly mixed therein. After the desiccant is added and mixed in, the ferromagnetic particles are slowly added and mixed into the composition. The resulting solvent-borne paint composition is filtered through a 10 micron filter bag to remove any large agglomerations. The solvent-borne paint composition is then added to a container, such as container 10 shown in FIG. 1, and then the propellant is added to form the magnetic aerosol paint composition.

Referring now to FIG. 1, the container 10 comprises a body 12, to which a valve cup 14 is secured. A valve assembly 16 with a dip tube 18 connected thereto is secured to the valve cup 14. The dip tube 18 extends into the interior of the body 12 and is in contact with the magnetic aerosol paint composition, which is designated by the numeral 100. The body 12 may be composed of aluminum or tin plated steel. The valve cup 14 may be sealed to the can 12 and the propellant charged through the valve assembly 16, or the body 12 may be charged with the propellant under the valve cup 14, and then the valve cup 14 sealed to the body 12. An actuator 20 is then connected to the valve assembly 16. One useful valve assembly 16 is a "female" valve with a spray controller 22. The spray controller 22 permits the aerosol magnetic composition to be dispersed even when the container 10 is inverted.

The selection of the valve assembly 16, the dip tube 18 and the actuator 20 are important to provide acceptable spraying characteristics for the aerosol magnetic paint composition. The following guidelines have been developed in order to successfully provide an aerosol paint product comprising the aerosol magnetic paint composition.

In the present invention, it has been found that in order to spray the aerosol magnetic paint composition acceptably (that is, the aerosol magnetic paint composition does not clog the valve or actuator, and it atomizes properly) it is important to select the valve assembly 16, the actuator 20 and the dip tube 18 combination carefully. In the present invention, the preferred valve assembly 16 is a valve that contains a vapor tap. A vapor tap is a small hole placed at the base of the valve, inside the pressurized container 10, which operates so as to draw vapor into the valve as the paint is drawn through the dip tube. Typical circular cross section vapor taps range in diameter from about 0.008 inch to about 0.030 inch. Preferably, the vapor tap has a 0.008 inch diameter and the dip tube 18 has a diameter of about 0.147 inch. A commercially-available valve assembly that may be used is the AR-74 sold by SeaquistPerfect Dispensing.

The selection of the actuator 20 is likewise important. The actuator 10 is inserted into the top of the valve assembly 16 and, when depressed, interacts with the valve assembly 16 to control the release of the aerosol magnetic paint composition from the container 10. Two types of actuators exist: "mechanical break-up" and "non-mechanical break-up" actuators. Mechanical break-up actuators have physical structures designed to impede the flow of the sprayed material as it exits the actuator in order to mechanically break-up the particles. Non-mechanical break-up actuators do not have such a structure. Preferably, the actuator 20 is a non-mechanical break-up actuator because the likelihood of clogging the actuator 20 is lessened. A commercially-available actuator that may be used is the RAR-52 sold by SeaquistPerfect Dispensing.

The magnetic aerosol paint composition of the present invention adheres to a variety of different surfaces, including wood, drywall and metal, all of which are suitable substrates.

The invention will be better understood by reference to the following example:

EXAMPLE 1

A gray batch of the inventive solvent-borne paint composition was formed in a mixing vessel. The batch was formed from the following components in the noted amounts, where parts are parts by weight.

| | |
|---|---|
| (a.) Toluene | 85.714 parts |
| (b.) POLYCHEM OP-94-1 | 367.200 parts |
| (c.) Thixatrol SR | 15.000 parts |
| (d.) SUSPENO® 201-T | 15.000 parts |
| (e.) Nuosperse 657 | 3.688 parts |
| (f.) Methyl Ethyl Ketoxime | 1.229 parts |
| (g.) Titanium Dioxide | 60.000 parts |
| (h.) Nicron 504 Talc | 150.000 parts |
| (i.) Syloid ZN-1 | 15.000 parts |
| (j.) Iron Powder | 500.000 parts |
| (k.) Aromatic Naptha 100 Flash | 57.754 parts |
| (l.) Silicon anti-flooding solution | 1.299 parts |
| (m.) 2-Butoxy Ethanol | 64.452 parts |
| (n.) 12% cobalt drier | 0.615 parts |
| (o.) 24% zirconium drier | 2.459 parts |
| Total | 1339.410 parts |

Where:
(b.) POLYCHEM OP-94-1 is a vinyl toluene modified alkyd resin formed from soybean oil and linseed oil that is available from OPC Polymers of Columbus, Ohio.
(c.) Thixatrol SR is a 30% active polyester amide thixotrope available from Elementis Specialties, Inc.
(d.) SUSPENO® 201-T is an organic anti-settling, anti-sag rheological additive available from Poly-Resyn, Inc., located in Dundee, IL 60118.
(e.) Nuosperse 657 is a pigment dispersant available from Condea Servo LLC
(h.) Nicron 504 is talc available from Luzenac North America
(i.) Syloid ZN-1 is a desiccant comprising $Na_2O:Al_2O_3:2.8\ SiO_2:XH_2O$ available from Davison Chemical Division of W. R. Grace.

43.6 parts by weight of the batch of the solvent-borne paint composition, 8 parts by weight of toluene, 15.5 parts by weight of acetone, 2.7 parts by weight type I aliphatic naptha, and 0.2 parts by weight of Catafor CA 80 were then charged to an aerosol container composed of tin-plated steel and pressurized with 30 parts by weight of a blend of n-butane and propane to thereby yield a batch of an magnetic aerosol paint composition.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:
1. An aerosol paint product comprising:
   (a) a container comprising a can, a valve cup with a valve assembly, a dip tube and an actuator; and
   (b) a magnetic aerosol paint composition disposed within said container, said magnetic aerosol paint composition comprising:
      (i) at least one volatile organic solvent;
      (ii) at least one film-forming resin;
      (iii) ferromagnetic particles; and
      (iv) a propellant selected from the group consisting of ethers, C1–C4 saturated hydrocarbons, hydrofluorocarbons, and mixtures of the foregoing;
   wherein the ferromagnetic particles are present at a level of at least 25% of the total weight of ferromagnetic particles, resin and organic solvent.

2. The aerosol paint product of claim 1, wherein the propellant is a blend of n-butane and propane.

3. The aerosol paint product of claim 1 wherein the film-forming resin is selected from the group consisting of alkyd resins, aromatic hydrocarbon resins, and epoxy ester resins.

4. The aerosol product of claim 3 wherein the resin is an alkyd.

5. The aerosol product of claim 4 wherein the resin is a vinyl toluene modified alkyd.

6. The aerosol paint product of claim 1 wherein the aerosol paint composition is substantially free of water.

7. The aerosol product of claim 1 wherein the aerosol paint composition comprises a desiccant.

8. The aerosol paint product of claim 1 wherein the aerosol paint composition comprises a whitening pigment.

9. The aerosol paint product of claim 1 wherein the aerosol paint composition comprises an extender pigment.

10. The aerosol paint product of claim 1 wherein the average particle size of the ferromagnetic particles is less than 10 microns.

11. The aerosol paint product of claim 1 wherein the average particle size of the ferromagnetic particle is from about 2 microns to about 7 microns.

12. The aerosol paint product of claim 1 wherein the aerosol paint composition comprises an antistatic agent.

13. An aerosol paint product comprising:
(a) a container comprising a can, a valve cup with a valve assembly, a dip tube and an actuator; and
(b) a magnetic aerosol paint composition disposed within said container, said magnetic aerosol paint composition comprising:
(i) a solvent borne paint composition comprising:
20 to 50 weight percent film-forming resin;
25 to 50 weight percent ferromagnetic particles;
10 to 30 weight percent organic solvent; and
(ii) an aerosol propellant.

14. The aerosol paint product of claim 13 wherein the solvent borne paint composition comprises:
20 to 35 weight percent film-forming resin;
30 to 40 weight percent ferromagnetic particles;
10 to 30 weight percent organic solvent.

15. A process of imparting magnetic properties to the surface of a substrate which process comprises:
(1) providing an aerosol paint product comprising:
(a) a container comprising a can, a valve cup with a valve assembly, a dip tube and an actuator; and
(b) a magnetic aerosol paint composition disposed within said container, said magnetic aerosol paint composition comprising:
(i) at least one volatile organic solvent;
(ii) at least one film-forming resin;
(iii) ferromagnetic particles; and
(iv) a propellant selected from the group consisting of ethers, C1–C4 saturated hydrocarbons, hydrofluorocarbons, and mixtures of the foregoing;
(2) applying the paint composition to a surface of a substrate by activating the actuator to create an aerosol spray of the paint composition;
(3) directing the aerosol spray onto a surface of the substrate; and
(4) allowing the paint composition to cure or dry;
wherein the ferromagnetic particles are present at a level of at least 25% of the total weight of ferromagnetic particles, resin and organic solvent.

16. An aerosol paint product comprising:
(a) a container comprising a can, a valve cup with a valve assembly, a dip tube and an actuator; and
(b) a magnetic aerosol paint composition disposed within said container, said magnetic aerosol paint composition comprising:
(i) at least one volatile organic solvent;
(ii) at least one film-forming resin;
(iii) ferromagnetic particles; and
(iii) a propellant selected from the group consisting of ethers, C1–C4 saturated hydrocarbons, hydrofluorocarbons, and mixtures of the foregoing;
wherein the average particle size of the ferromagnetic particles is less than 10 microns.

17. The aerosol paint product of claim 16, wherein the propellant is a blend of n-butane and propane.

18. The aerosol paint product of claim 16 wherein the film-forming resin is selected from the group consisting of alkyd resins, aromatic hydrocarbon resins, and epoxy ester resins.

19. The aerosol product of claim 16 wherein the resin is an alkyd.

20. The aerosol product of claim 16 wherein the resin is a vinyl toluene modified alkyd.

21. The aerosol paint product of claim 16 wherein the aerosol paint composition is substantially free of water.

22. The aerosol product of claim 16 wherein the aerosol paint composition comprises a desiccant.

23. The aerosol paint product of claim 16 wherein the aerosol paint composition comprises a whitening pigment.

24. The aerosol paint product of claim 16 wherein the aerosol paint composition comprises an extender pigment.

25. The aerosol paint product of claim 16 wherein the average particle size of the ferromagnetic particle is from about 2 microns to about 7 microns.

26. The aerosol paint product of claim 16 wherein the aerosol paint composition comprises an anti static agent.

27. A process of imparting magnetic properties to the surface of a substrate which process comprises:
(1) providing an aerosol paint product comprising:
(a) a container comprising a can, a valve cup with a valve assembly, a dip tube and an actuator; and
(b) a magnetic aerosol paint composition disposed within said container, said magnetic aerosol paint composition comprising:
(i) at least one volatile organic solvent;
(ii) at least one film-forming resin;
(iii) ferromagnetic particles; and
(iv) a propellant selected from the group consisting of ethers, C1–C4 saturated hydrocarbons, hydrofluorocarbons, and mixtures of the foregoing;
(2) applying the paint composition to a surface of a substrate by activating the actuator to create an aerosol spray of the paint composition;
(3) directing the aerosol spray onto a surface of the substrate; and
(4) allowing the paint composition to cure or dry;
wherein the average particle size of the ferromagnetic particles is less than 10 microns.

* * * * *